June 17, 1941.  A. T. BRUMFIELD  2,246,430
TRACK GAUGE
Filed Sept. 12, 1940  3 Sheets-Sheet 1
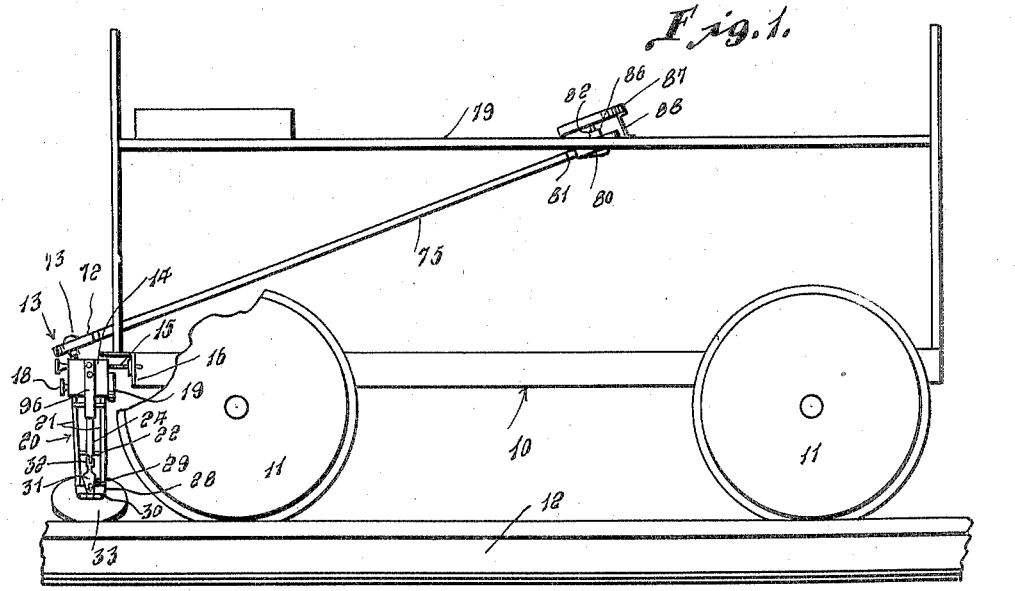
Fig. 1.
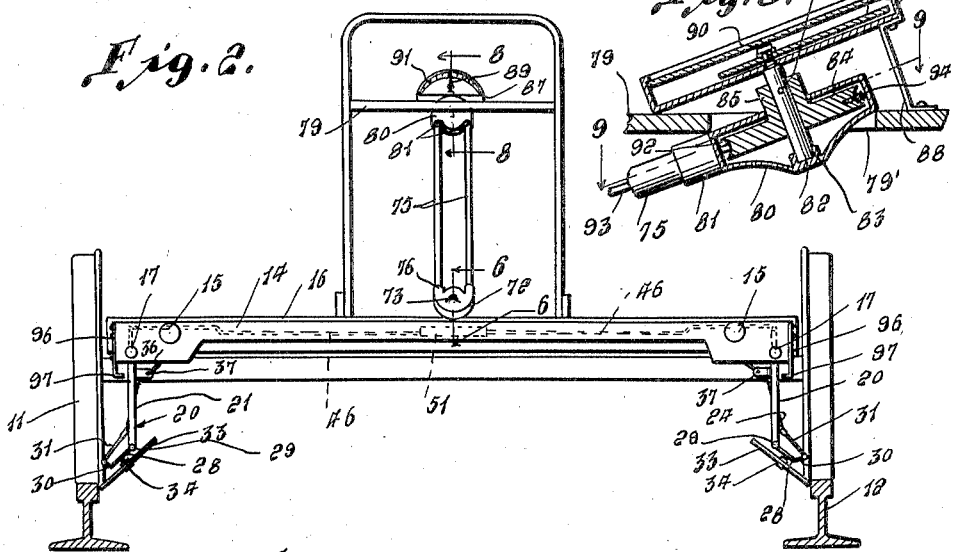
Fig. 2.
Fig. 3.
Inventor
A. T. Brumfield
Attorney

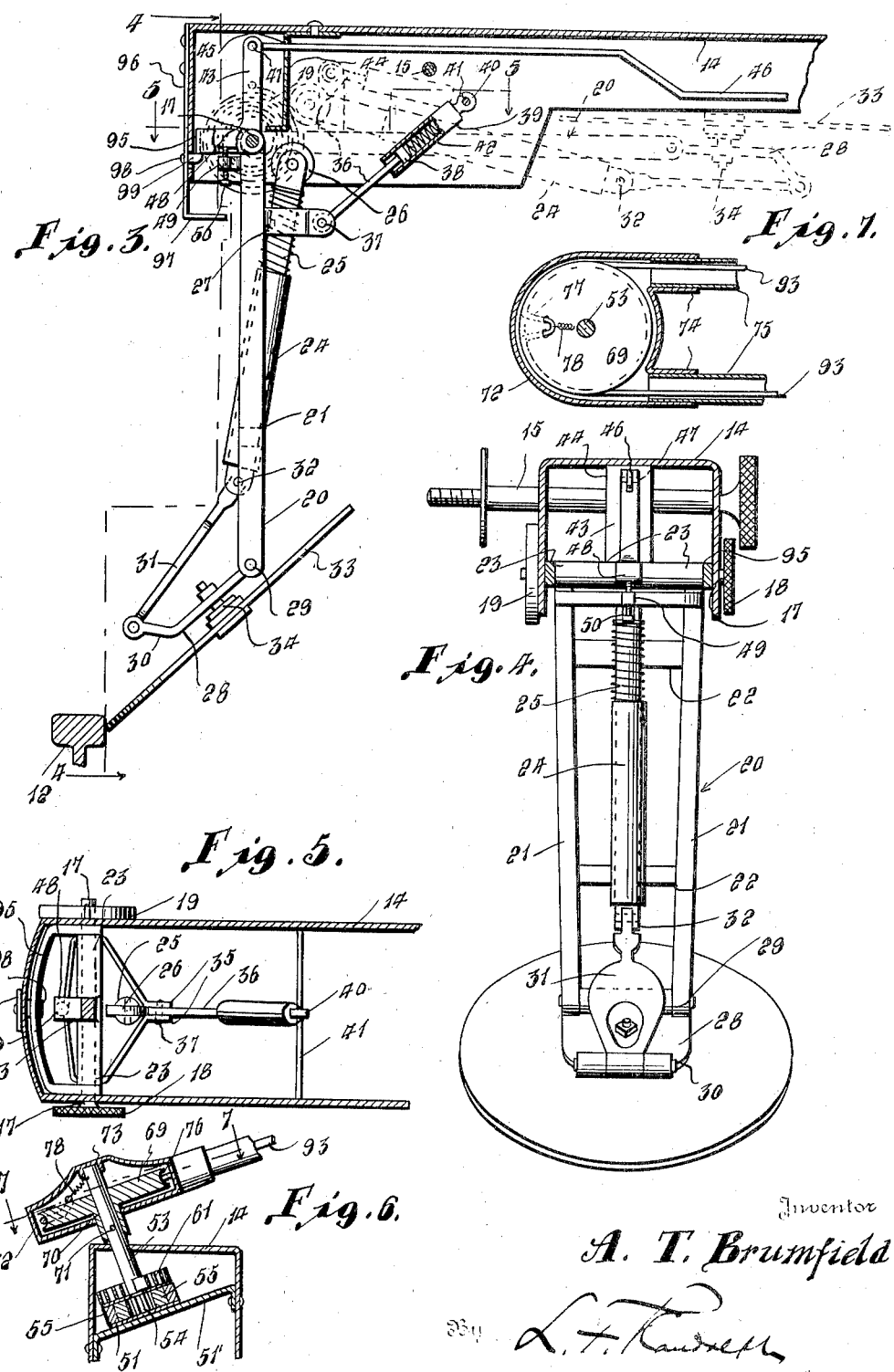

June 17, 1941.  A. T. BRUMFIELD  2,246,430
TRACK GAUGE
Filed Sept. 12, 1940  3 Sheets-Sheet 3
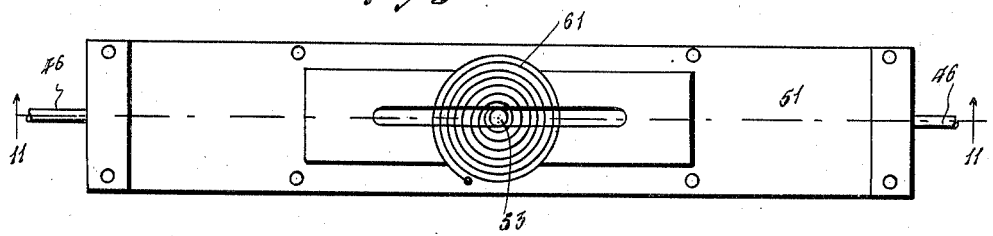
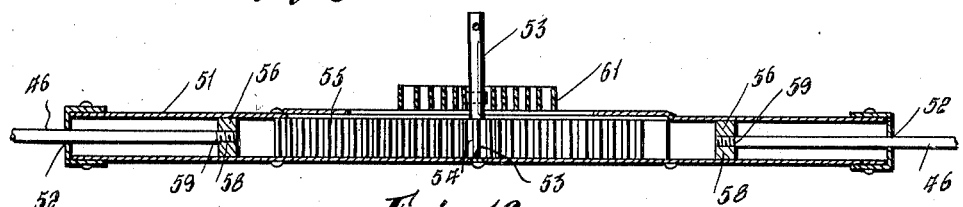
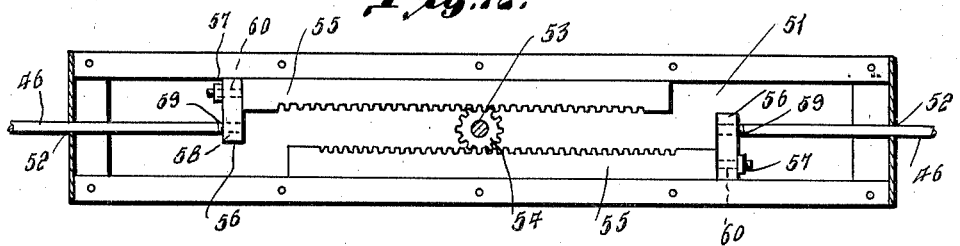
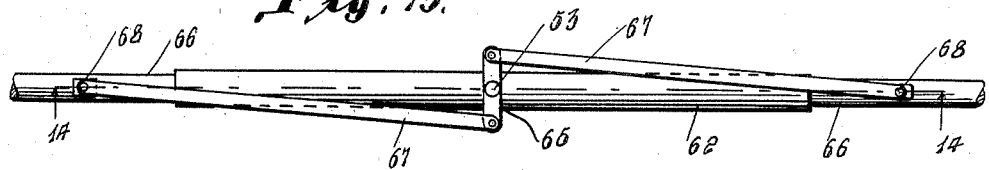
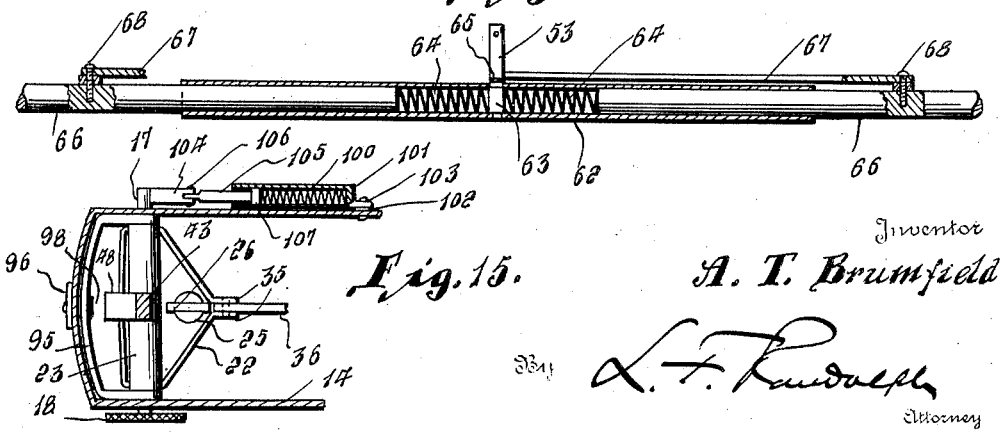
Inventor
A. T. Brumfield Patented June 17, 1941

2,246,430

UNITED STATES PATENT OFFICE 2,246,430

TRACK GAUGE

Ambrose T. Brumfield, New Salem, N. Dak.

Application September 12, 1940, Serial No. 356,541

8 Claims. (Cl. 33—146)

This invention relates to an improved construction of gauge for measuring the width or gauge of a track and more particularly to a device adapted to be detachably mounted on a railway vehicle, such as a motor car used by a track inspector.

It is an object of the invention to provide a device for indicating the gauge of a railway track which is adapted to be detachably mounted on a railway vehicle for actuating a gauge or other indicator for indicating to an operator or a passenger of the vehicle the gauge of the track over which the vehicle is passing to thereby provide a device for replacing the conventional hand gauges generally used for measuring the gauge of railway tracks and to provide a measuring instrument by means of which a much greater extent of track may be measured in a given period than by means of a hand gauge.

More particularly, it is an aim of the invention to provide a measuring instrument, of the class heretofore described, having rotatable disc members for engaging the inner sides of a pair of rails, said disc members being pivotally connected to spring actuated pivotally mounted arms whereby said disc members are held in engagement with the heads of the rails.

Still another aim of the invention is to provide spring means for positioning said disc members at oblique angles to the arms and to the rails, and means whereby said arms may be folded inwardly and upwardly relatively to each other when not in use.

Still a further aim of the invention is to provide means for rocking the supports of said disc members relatively to the arms, when the arms are folded, to move the disc members to positions substantially parallel to the arms.

Still a further aim of the invention is to provide spring actuated yokes for engaging and swinging the arms inwardly relatively to each other when the device is raised relatively to the rails to move said discs upwardly and out of engagement therewith to thereby prevent the arms and discs from swinging outwardly beyond the vertical planes of the rails so that the discs would otherwise be damaged if the measuring device was thereafter moved downwardly.

Other objects and advantages of the invention will hereinafter become more fully apparent from the following description of the drawings, which illustrate preferred embodiments of the invention, and wherein—

Figure 1 is a side elevational view of a railway vehicle showing the measuring instrument attached to the rear end thereof and transversely of the vehicle, Figure 2 is a view taken at right angles to Figure 1 and looking toward the end of the vehicle on which the measuring device is mounted, Figure 3 is an enlarged fragmentary longitudinal vertical sectional view, partly in elevation of a portion of the invention, Figure 4 is a transverse vertical sectional view taken substantially along the plane of the line 4—4 of Figure 3, Figure 5 is a longitudinal horizontal sectional view taken substantially along the plane of the line 5—5 of Figure 3, Figure 6 is an enlarged transverse vertical sectional view taken substantially along the plane of the line 6—6 of Figure 2, Figure 7 is a sectional view taken substantially along the plane of the line 7—7 of Figure 6, Figure 8 is an enlarged transverse vertical sectional view taken substantially along the plane of the line 8—8 of Figure 2, Figure 9 is a sectional view taken substantially along the plane of the line 9—9 of Figure 8, Figure 10 is a plan view of a portion of the device, Figure 11 is a longitudinal vertical sectional view taken substantially along the plane of the line 11—11 of Figure 10, Figure 12 is a plan view of the parts disposed within the casing, shown in Figure 10, with the cover or top wall of said casing removed, Figure 13 is a view similar to Figure 10 showing a modified construction of a portion of the invention as disclosed in Figures 10 to 12, Figure 14 is a longitudinal vertical sectional view, partly in elevation, taken substantially along the plane of the line 14—14 of Figure 13, and Figure 15 is a view similar to Figure 5 showing another modification of a portion of the invention.

Referring more particularly to the drawings, wherein like reference characters designate like or corresponding parts throughout the different views, 10 designates generally a vehicle provided with railway wheels 11 for engaging a pair of rails 12, forming a railway track. The vehicle 10, forms no part of the invention, but is shown merely to illustrate the application of the invention and may be of any suitable construction, preferably of the motor driven type conventionally employed by railway track inspectors.

The invention comprises a device for measuring the gauge of the track over which the vehicle 10 is moving. Said measuring instrument, designated generally 13, includes an elongated, inverted channel shaped frame 14 through which extends a plurality of bolt fastenings 15 which are adapted to engage threaded openings, not shown, in the rear crossbar 16 of the frame of the vehicle 10 for mounting the channel member 14 at the rear of and transversely of the vehicle 10. A shaft 17 extends transversely through and is journaled in the frame 14, adjacent each of its ends. Each of the shafts 17 is provided with a turning knob 18, on one end thereof, and a spiral spring 19 on its opposite end, which elements are disposed on the outer side of the frame 14. Referring to Figure 2, the spiral spring 19 of the shaft 17, disposed adjacent to the left hand end of the frame 14, urges said shaft to rotate in a counterclockwise direction, while the spiral spring 19 of the shaft 17, disposed adjacent the right hand end of the frame 14, urges said last mentioned shaft to rotate in a clockwise direction.

An arm, designated generally 20, is turnably mounted on each of the shafts 17. Each of the arms 20 includes the longitudinal bars 21 which are connected by the transverse bars 22. Bars 21 at their upper ends, are provided with bearings 23 for engaging the shafts 17 for pivotally mounting the arms 20 relatively to the frame 14. A tube 24 is fixedly secured to each of the arms 20 and disposed at an angle thereto, as best seen in Figure 3. A rod 25 is slidably mounted in each of the tubes 24. Rods 25 are of sufficient length to extend beyond the ends of the tubes 24 and are provided at their upper ends with rollers 26. Expansion coil springs 27 are carried by the upper portions of the rods 25 for urging the rods upwardly relatively to the tubes 24. A plate 28 is hingedly connected at 29, at one end thereof, to the lower end of each of the arms 20. Plates 28 are provided with the obliquely disposed free ends 30 to which are pivotally connected links 31. The opposite, free ends of the links 31 are pivotally connected at 32 to the lower ends of the rods 25 and form abutments for engaging the lower ends of the tubes 24 to limit the upward movement of the rods 25. A disc 33 is connected by means of a fastening 34 to each of the plates 28. Fastenings 34 rotatably mount the discs 33 relatively to the plates 28 and position said discs on the under or inner sides of the plates 28 and in spaced apart, substantially parallel relationship thereto. When the rods 25 are in their normal projected positions, as best illustrated in Figures 2 and 3, plates 28 and the discs 33 are disposed at oblique angles to the arms 20 so that the discs 33 extend downwardly and outwardly relatively to the depending ends of the arms 20 for engaging the inner sides of the heads of the rails 12.

The upper crossbar 22 of each of the arms 20 is formed of sections which project from the inner sides of the arms 20 and which are provided with apertured free ends 35 for receiving an end of a rod 36 which is pivotally connected to the ends 35 by a pintle 37. Rod 36, at its opposite end, is provided with a head or piston 38 which is slidably mounted in a cylinder 39. The cylinders 39 are each provided with eyelets 40 at their upper, closed ends. The cylinders 39 are connected to the frame 14 by means of rods 41, which extend through the eyelets 40, and which are secured to the sides of the frame 14. The cylinders 39 are pivotally mounted relatively to the rods 41 and contain expansion coil springs 42 which urge the pistons 38 and rods 36 outwardly relatively to the cylinders, for urging the arms 20 outwardly, relatively to each other, to thereby yieldably hold the discs 33 in engagement with the inner sides of the heads of the rails 12.

A rocker arm 43 is loosely connected at one end thereof to each of the shafts 17 between the bearings 23, as best seen in Figure 4. Rocker arms 43 extend upwardly from the shafts 17 to adjacent the upper portion of the frame 14. Frame 14 is provided, adjacent each of its ends with a depending plate 44, which is disposed inwardly of the rocker arms 43, and which are provided with openings 45, through each of which openings a rod 46 loosely extends and is slidably mounted. The remote ends of the rods 46 are pivotally connected by pins 47 to the upper, free ends of the rocker arms 43. Rocker arms 43, adjacent their lower ends, are provided with outwardly projecting extensions 48. The arms 20 are provided with the outwardly projecting lugs 49, which are disposed beneath the extensions 48, and which are provided with threaded apertures, not shown, for adjustably receiving the screws 50, the upper ends of which bear against the under sides of the extensions 48 for urging the rocker arms 43 and the rods 46 inwardly of each other.

Referring particularly to Figures 2, 10, 11 and 12, a casing 51 is secured in the frame 14, intermediate of the ends thereof. The casing 51 is supported in the frame 14 and at an oblique angle thereto by means of a supporting bracket 51', as best seen in Figure 6. Casing 51 extends longitudinally of the frame 14 and is provided at its ends with openings 52 through which extend the adjacent ends of the rods 46 and in which said ends are slidably mounted. A shaft 53 is journaled in the casing 51, intermediate of its ends, and is disposed perpendicularly thereof. A pinion 54 is keyed to the shaft 53 and is disposed within the casing 51 to mesh with the teeth of a pair of rack bars 55 which are slidably mounted in the casing 51 and on opposite sides of the pinion 54. The adjacent ends of the rods 46 are connected to the remote ends of the rack bars 55 by the cross heads 56 and the nut and bolt fastenings 57. Crossheads 56, as best seen in Figure 12, are provided with drilled openings 58 to receive the threaded ends 59 of the rods 46 and with openings 60 through which extend the bolts, which form part of the fastenings 57, and which project from the ends of the rack bars 55. The nuts of the fastenings 57 are attached to the threaded, free ends of the bolts for detachably securing the crossheads 56 thereto. A spiral spring 61, is secured at one end to the casing 51 and at its opposite end to the shaft 53 for urging the shaft 53 to rotate in a counterclockwise direction, as viewed in Figure 10, to urge the rack bars 55 and the rods 46, connected thereto outwardly of the ends of the casing 51 to thereby prevent slack in the parts and to urge the rocker arms 43 outwardly relatively to each other so that their extensions 48 will be held in engagement with the adjusting screws 50.

In lieu of the casing 51 and the parts contained therein, the shaft 53 may be journaled in a tube 62 which is suitably secured in the frame 14, by means, not shown, and which is disposed intermediate of the ends of said frame and longitudinally thereof. The shaft 53 extends through and is journaled in a block 63 disposed intermediate of the ends of the tube 62 and which is secured thereto to form an abutment for the adjacent ends of a pair of expansion coil springs 64. The exposed, upper portion of the shaft 53 is provided with a cross arm 65 which is fixedly secured to the shaft 53 intermediate of its ends. In the embodiment of the invention as disclosed in Figures 13 and 14, the rods 46 are provided with the enlarged adjacent portions 66, the free ends of which are disposed in telescoping engagement with the ends of the tube 62 and in abutting engagement with the remote ends of the springs 64, which tend to urge the rods 46 and their portions 66 outwardly, relatively to each other in the same manner and for the same purpose as the spiral spring 61. A pair of links 67 are pivotally connected at their adjacent ends to the ends of the cross arm 65 and are pivotally connected at their remote ends by means of the screws 68 to exposed portions of the end portions 66, so that when the rods 46 and ends 66 move inwardly, relatively to each other, shaft 53 will be turned in a counterclockwise direction, as seen in Figure 13, and when the parts move outwardly relatively to each other, shaft 53 will be turned in a clockwise direction.

Referring particularly to Figure 6, a pulley 69 is mounted on the upper portion of the shaft 53 and is provided with a hub portion 70 which is secured to said shaft by means of a pin 71 for keying the pulley 69 to the shaft 53. A casing 72 encloses the pulley 69 and the upper portion of the shaft 53 and is provided with a socket 73, in the upper portion thereof, to receive the upper end of the shaft 53 which is journaled therein and by means of which the casing 72 is supported on the shaft 53. Casing 72, as best seen in Figure 7, is provided with a pair of annular spaced, substantially parallel outlets 74 to receive corresponding ends of a pair of tubes 75. Pulley 69 is provided with a grooved periphery 76 and with a recess 77, which opens outwardly of a portion of the grooved periphery 76. A contractile coil spring 78 is secured at one end to the shaft 53 and into the inner end of the recess 77, for a purpose which will hereinafter be described.

Referring particularly to Figures 1 and 8, the vehicle 10 is provided with a platform 79 having an opening 79' in which is secured a casing 80, corresponding to the casing 72, provided with the annular outlets 81 in which are secured the opposite ends of the tubes 75. A shaft 82 has a lower end extending into the casing 80 and which is journaled in a socket portion 83. A pulley 84 is mounted on the shaft 82 and disposed within the casing 80. Pulley 84 is provided with a hub 85, which is journaled in the upper side of the casing 80 and which is secured to the shaft 82 by means of a pin 86. A dial face 87 is mounted on the upper side of the platform 78 and disposed at an oblique angle thereto. Dial 87 is secured in a position relatively to platform 78 by means of a bracket 88. The upper end of the shaft 82 is journaled in the bottom portion of the dial face 87, and a pointer 89, which is disposed within the dial 87, is secured by means of a screw fastening 90 to the upper end of the shaft 82. The pointer 89, as best seen in Figure 2, is provided with an arrow tipped end which is adapted to move relatively to calibrations 91 on the dial 87, for indicating variations in the gauge of the rails 12, as will hereinafter become more fully apparent. The pulley 84 is likewise provided with a grooved periphery 92. An endless cable 93 is trained around the grooved peripheries of the pulleys 69 and 84 and extends through the tubes 75 so that the cable 93 is entirely enclosed by said tubes and by the casings 72 and 80. A fastening 94 secures a portion of the cable 93 to a portion of the grooved periphery of the pulley 84 to prevent the cable 93 from slipping relatively to the pulleys. The free end of the contractile coil spring 78 is secured to a portion of the cable 93 for drawing said last mentioned portion into the recess 77 to thereby tension the cable and prevent it from slipping relatively to the pulley 69.

From the foregoing it will be obvious that the springs 27 will hold the discs 33 at an oblique angle to the rails 12, as best illustrated in Figure 2, and that the springs 42, through the rods 36 will urge the arms 20 outwardly of each other, to cause the peripheries of the discs 33 to frictionally engage the inner sides of the heads of the rails 12 and to be revolved to roll therealong, due to traction, as the vehicle 10 moves over the rails. The screws 50 can be adjusted to move the rocker arms 43 and their rods 46 so that when the discs 33 are in engagement with corresponding portions of the rails 12, which are of the proper gauge, the arrow tipped end of the pointer 89 will be centered over the zero of the calibrations 91. As the discs 33 move along the rails, they will come in contact with portions which are spaced a greater distance apart than the correct gauge of the track thereby causing the arms 20 to swing outwardly so that the screws 50 will force the extensions 48 upwardly to swing the rocker arms 43 inwardly. This will move the rods 46 inwardly to turn the shaft 53 in a clockwise direction, when associated with the parts as shown in Figures 10 to 12. Cable 93 will thereby be moved to turn the shaft 82 in the same direction to cause the arrow tipped end of the pointer 89 to swing to the right, relatively to the calibrations 91 to indicate that the width of the rails, at the particular point, is greater than the correct track gauge. The location of this portion of the track and the extent that it varies from the correct gauge can be recorded by one of the occupants of the vehicle 10 so that proper correction may thereafter be made. If the rails 12 are narrower than the correct gauge, at any portion thereof, the arms 20 will be swung inwardly relatively to each other thereby causing the screws 50 to move downwardly and out of engagement with the extensions 48 to permit the spiral spring 61 to turn the shaft 53 in a counterclockwise direction to swing the rocker arms 43 outwardly until their extensions 48 again come in contact with the set screws 50. This counterclockwise movement of the shaft 53 will cause the shaft 82 to be turned counterclockwise to turn the arrow tipped end of the pointer 89 to the left relatively to the calibrations 91 for indicating that the portion of the track is narrower than the correct gauge.

The operation will be the same where the measuring instrument 13 is provided with the parts, shown in Figures 13 and 14, rather than those shown in Figures 10 to 12, inclusive, except that the shaft 53 will be turned in a counterclockwise direction where the track is wider than the correct gauge and in a clockwise direction where it is narrower than the correct gauge, or in other words, conversely to the manner in which it is actuated when associated with the parts as shown in Figures 10 to 12, as heretofore described. Thus, the arrow tipped end of the pointer 89 will move to the left of its zero position to indicate width greater than the correct gauge and to the right to indicate width less than the correct gauge.

If, for any reason, it is desirable to position the measuring instrument 13 so that it will be inoperative without removing it from the vehicle 10, the arms 20 may be swung upwardly and inwardly to folded positions, such as the folded position of the left hand arm 20, as illustrated in dotted lines in Figure 3. As the arms 20 are swung inwardly and upwardly the rollers 26 will engage the inner sides of the plates 44 to retract the rods 25, to cause them to move downwardly relatively to the tubes 24 to thereby swing the plates 28 and the discs 33 into positions, substantially parallel to their arms 20, as illustrated in Figure 3, in dotted lines. In this manner, the parts 20, 28 and 33 can fold compactly into and beneath the frame 14. As the arms 20 are moved upwardly the rods 36 will be forced inwardly of the cylinders 39 and the pivot pins 37 will be swung upwardly and across the horizontal plane on the rods 41, into the dotted line positions, as seen in Figure 3, in which positions the springs 42 will be disposed to urge the arms 20 upwardly to thereby retain them in a folded position.

A yoke shaped member 95 is fixedly secured at its ends to each of the shafts 17. The yoke shaped members 95 are disposed within the frame 14. A leaf spring 96 is fixedly secured at its upper end to the outer side of each of the ends of the frame 14. The springs 96 depend downwardly below the ends of the frame 14 and are provided with inturned free ends forming detents 97. The leaf spring members 96 are provided with keeper elements 98 which project from their inner sides, intermediate of their ends, through openings 99 in the end walls of the frame 14 for engaging beneath the yokes 95 for supporting said yokes in substantially horizontal positions and for holding the spiral springs 19 tensioned.

Should the rear end of the vehicle 10, for any reason, move upwardly and away from the rails 12, sufficiently so that the discs 33 will be moved out of engagement with the inner sides of the heads of the rails, the arms 20 would be forced outwardly by the springs 42. This result would undoubtedly cause damage to the discs 33 when the rear end of the vehicle 10 again moved downwardly and back to its normal position, except for the fact that the arms 20 in moving outwardly will strike the detents 97 to force the leaf spring members 96 outwardly. This will cause the keeper members 98 to move outwardly and out of engagement with the yokes 95 which will be swung downwardly by the shafts 17, which will be turned in a direction, by the expansion of the springs 19, to cause the yokes 95 to swing downwardly and inwardly of one another. This movement of the yokes 95 will cause them to engage the arms 20 to swing the arms inwardly to folded positions so that the measuring device 13 will not be damaged. The knobs 18 can then be turned to return the yokes to their normal positions above the keepers 98, for retensioning the spiral springs 19 and for relatching the yokes 95 in retracted positions.

If desired, each of the spiral springs 19 may be dispensed with and replaced by means of an expansion coil spring 100, contained in a cylinder 101. Cylinder 101, as illustrated in Figure 15 is provided with a closed end, forming a seat for the inner end of the spring 100. The closed end of the cylinder 101 is provided with an eyelet 102 extending therefrom for receiving a fastening 103, by means of which the cylinder 101 is pivotally connected to one of the sides of the frame 14 and on the outer side thereof. The end of the shaft 17, opposite the end provided with the knob 18, is provided with an angularly projecting extension arm 104 to the free end of which is pivotally connected an end of a piston rod 105 by means of a pivot pin 106. The piston rod 105 is provided at its opposite end with a piston 107 which is slidably disposed in the cylinder 101 and against which the opposite end of the spring 100 bears to force the piston rod 105 outwardly of the cylinder 101. The extension 104 extends upwardly relatively to the shaft 17 so that the piston rod 105, when projected by the spring 100 will turn the extension 104 and the shaft 17 in a clockwise direction to swing the yoke 95 downwardly and inwardly. It is to be understood that each of the shafts 17 may be provided with the means, as heretofore described and as illustrated in Figure 15, for turning the shafts 17 in lieu of the spiral springs 19 and that the parts are so arranged relatively to each of the shafts 17 that the shafts, when actuated by the springs 100 will cause the yokes 95 to swing downwardly and inwardly relatively to each other.

Various modifications and changes are contemplated and may obviously be resorted to provided they fall within the spirit and scope of the invention as hereinafter defined by the appended claims.

I claim as my invention:

1. A track gauge comprising a frame, shafts journaled in said frame and disposed transversely thereof, arms loosely mounted on said shafts and depending therefrom, plates pivotally connected to the lower, free ends of said arms, discs carried by said plates, spring means for holding said discs at an oblique angle to the arms, means for yieldably urging the arms outwardly, lugs loosely connected to and projecting from said shafts, rods connected to the free ends of said lugs and extending inwardly of said frame, means associated with said rods and actuated thereby for indicating the gauge of a track, between which the discs are disposed, each of said lugs being provided with an extension for engaging one of said arms for swinging the lugs inwardly of each other when said arms are moved outwardly by said yieldable means, and means for moving the lugs away from each other, when said arms are contracted.

2. A device as in claim 1, comprising spring projected latch means, spring means for urging the shafts to rotate in one direction, members keyed to the shafts for engaging said latch means for normally holding said last mentioned spring means tensioned, said latch means being mounted on the ends of the frame and being releasable by the outward movement of said arms for releasing said members to permit the last mentioned spring means to rotate the shafts to cause said members to engage and swing the arms inwardly, relatively to each other.

3. A device as in claim 1, comprising means operable by the inward movement of said arms, relatively to each other, for rocking said plates relatively to the arms for moving the discs into substantially parallel relationship to the arms.

4. An attachment for use on railway vehicles comprising rotatably mounted members for engaging the inner sides of a pair of rails, arms for supporting said rotatable members, spring means for urging said arms outwardly of each other, means for indicating the gauge of the rails engaged by said rotatable members, means connecting said arms to said indicating means for causing the indicating means to be actuated in response to the movement of the arms, and spring actuated means for normally holding the rotatable members at oblique angles to the arms and to the rails.

5. An attachment for use on railway vehicles comprising rotatably mounted members for engaging the inner sides of a pair of rails, arms for supporting said rotatable members, spring means for urging said arms outwardly of each other, means for indicating the gauge of the rails engaged by said rotatable members, means connecting said arms to said indicating means for causing the indicating means to be actuated in response to the movement of the arms, means for swinging said arms upwardly and inwardly to folded positions relatively to each other, and latch means for normally holding said last mentioned means in an inoperative position, said latch means being movable to a released position by the outward movement of the arms.

6. In an attachment for railway vehicles, a dial mounted on a railway vehicle for indicating the gauge of the track over which the vehicle is moving, a frame detachably connected to the vehicle, arms pivotally connected to the frame and depending therefrom, means pivotally connected to the free ends of said arms, rotatable members carried by said means for engaging the inner sides of the rails of the track over which the vehicle is moving, yieldable means for normally holding the pivotal means and rotatable members at oblique angles to the arms, spring means for urging said arms outwardly for holding said rotatable members in yieldable engagement with the rails, said arms being movable relatively to the frame by variations in the width of the rails, and means connecting said arms to said dial for indicating the variations in the gauge of the track.

7. A device as in claim 6, comprising spring projected pivotally mounted yokes for engaging said arms to move them inwardly and upwardly to folded positions, latch means for normally holding said yokes in inoperative positions, and said latch means being releasable by the outward movement of the arms for releasing said yokes.

8. A track gauge comprising pivotally mounted members for engaging the inner sides of a pair of rails, spring means for urging said members outwardly and into engagement with said rails, said members being actuated by variations in the width of the space between the rails, a shaft, means connected to said members and to said shaft for rotating the shaft when said members are actuated, a dial face remotely positioned relatively to said members, a shaft journaled in said dial face, pulleys keyed to said shafts, an endless cable trained over said pulleys whereby said last mentioned shaft will be rotated by the rotation of the first mentioned shaft, and a pointer keyed to said last mentioned shaft and disposed over said dial face for indicating the variations in the gauge of the rails.

AMBROSE T. BRUMFIELD.